(12) United States Patent
Shih

(10) Patent No.: US 12,276,296 B2
(45) Date of Patent: Apr. 15, 2025

(54) SELF-DRILLING SCREW STRUCTURE AND MANUFACTURING METHOD THEREOF

(71) Applicant: BI-MIRTH CORP., Kaohsiung (TW)

(72) Inventor: Yi-Chieh Shih, Kaohsiung (TW)

(73) Assignee: BI-MIRTH CORP., Kaohsiung (TW)

(*) Notice: Subject to any disclaimer, the term of this patent is extended or adjusted under 35 U.S.C. 154(b) by 290 days.

(21) Appl. No.: 17/948,476

(22) Filed: Sep. 20, 2022

(65) Prior Publication Data

US 2024/0093712 A1 Mar. 21, 2024

(51) Int. Cl.
*F16B 25/10* (2006.01)
*B21H 3/04* (2006.01)

(52) U.S. Cl.
CPC ........... *F16B 25/103* (2013.01); *B21H 3/042* (2013.01)

(58) Field of Classification Search
CPC ......... B21H 3/042; F16B 3/042; F16B 25/103
USPC ...................................... 411/387.1
See application file for complete search history.

(56) References Cited

U.S. PATENT DOCUMENTS

| | | | | |
|---|---|---|---|---|
| 3,094,894 A | * | 6/1963 | Broberg | F16B 25/0084 411/417 |
| 2010/0183400 A1 | * | 7/2010 | Chen | F16B 25/0021 411/394 |
| 2011/0280684 A1 | * | 11/2011 | Lai | F16B 25/103 470/10 |
| 2012/0303074 A1 | * | 11/2012 | Stiebitz | F16B 25/103 606/311 |
| 2014/0277180 A1 | * | 9/2014 | Paolino | A61B 17/8605 606/291 |
| 2016/0223008 A1 | * | 8/2016 | Cheng | F16B 25/0084 |
| 2018/0209466 A1 | * | 7/2018 | Chao | F16B 25/0078 |
| 2018/0238373 A1 | * | 8/2018 | Huang | F16B 25/103 |
| 2021/0215185 A1 | * | 7/2021 | Su | F16B 25/0084 |
| 2021/0222722 A1 | * | 7/2021 | Hsu | F16B 25/0057 |
| 2021/0277926 A1 | * | 9/2021 | Huang | F16B 25/103 |
| 2022/0126356 A1 | * | 4/2022 | Chen | B21H 3/027 |
| 2022/0213919 A1 | * | 7/2022 | Gong | F16B 25/0084 |

* cited by examiner

*Primary Examiner* — Gary W Estremsky
(74) *Attorney, Agent, or Firm* — Muncy, Geissler, Olds & Lowe, P.C.

(57) ABSTRACT

The invention provides a self-drilling screw structure and a manufacturing method thereof, wherein the manufacturing method includes: providing screw body, forming drill tail screw rod section, forming concave neck portion, forming drill tail cutting edge and forming thread. The self-drilling screw structure including a screw head portion and a screw rod portion, the screw rod portion is sequentially provided with a threaded screw rod section, a drill tail screw rod section and a drill bit screw rod section, the drill tail screw rod section has a rod diameter of drill tail, a plurality of drill tail cutting edges and a plurality of drill tail chip discharge grooves, the drill bit screw rod section is provided with a concave neck portion, and the drill bit screw rod section is protruded to form a plurality of drill bit cutting edges and the plurality of drill bit chip discharge grooves.

4 Claims, 8 Drawing Sheets

SELF-DRILLING SCREW STRUCTURE AND MANUFACTURING METHOD THEREOF

FIELD OF THE INVENTION

The invention relates to a self-drilling screw and a manufacturing method thereof, in particular to a self-drilling screw structure including an arc surface and cutting edges not connected with chip discharge grooves that is capable of rapidly discharging chips.

BACKGROUND OF THE INVENTION

According to a conventional self-drilling screw, chip discharge grooves and cutting edges are integrally formed by directly stamping and molding. Since the chip discharge grooves are stamped and molded on a flat surface by a stamping die, the chip discharge grooves are designed to be perpendicularly or slightly obliquely extend on a surface, but the conventional self-drilling screw has an advantage of mass production.

However, although the directly stamped and molded conventional self-drilling screw has the advantage of mass production, the conventional stamped self-drilling screw has poor chip discharge capability after positioning and drilling at a static point of a front end, so displacement occurs during drilling and results in a deviation of a drilling position from a predetermined position. In view of this, the inventor particularly concentrates on the research combining with the learned acknowledge, and in order to solve the above problems, proposes a self-drilling screw structure including two different discontinuous cutting edges formed in a stamping manner and a thread rolling manner, to overcome the conventional defects.

SUMMARY OF THE INVENTION

A purpose of the invention is to form different cutting edges in a stamping manner and a thread rolling manner and connect a concave neck portion with the cutting edges formed in different manners, thereby solving the problems that the conventional self-drilling screw cannot effectively discharge chips and has poor stability during hole-expanding.

To achieve the above purpose, the invention provides a manufacturing method of a self-drilling screw, which is a method for manufacturing a self-drilling screw including threads with substantially equal major diameter formed at rod having various diameters, wherein the manufacturing method of the self-drilling screw comprises: providing screw body, providing a screw body comprising a screw head portion and a screw rod portion extending from a side of the screw head portion along an axial direction of the screw head portion; forming drill tail screw rod section, sequentially forming a threaded screw rod section, a drill tail screw rod section and a drill bit screw rod section at the screw rod portion from the side of the screw head portion, wherein the threaded screw rod section has a rod diameter of thread, and the drill tail screw rod section has a rod diameter of drill tail; forming concave neck portion, and forming a concave neck portion, a positioning portion and a tip portion from the drill bit screw rod section in a stamping manner, wherein the drill bit screw rod section is sequentially provided with the concave neck portion, the positioning portion and the tip portion from an end adjacent to the drill tail screw rod section along the axial direction, and wherein a chisel point is formed by tapering from an end of the tip portion adjacent to the positioning portion to the other end along the axial direction, the concave neck portion is recessed from an end adjacent to the drill tail screw rod section to an end adjacent to the positioning portion along the axial direction to form an arc surface, the drill bit screw rod section forms a plurality of drill bit cutting edges and a plurality of drill bit chip discharge grooves from the chisel point toward the concave neck portion along the axial direction; and the plurality of drill bit chip discharge grooves are located between the adjacent drill bit cutting edges; forming drill tail cutting edge, forming a plurality of drill tail cutting edges and a plurality of drill tail chip discharge grooves from one end of the drill tail screw rod section connected with the concave neck portion in a thread rolling manner, wherein the plurality of drill tail chip discharge grooves are located between the adjacent drill tail cutting edges, and the plurality of drill tail cutting edges each have a major diameter of drill tail cutting edge; and forming thread, forming a thread in a thread rolling manner from the end of the threaded screw rod section adjacent to the drill tail screw rod section, wherein the thread spirally extends to the screw head portion along the axial direction, and the thread has a major diameter of thread; wherein the rod diameter of drill tail is less than the rod diameter of thread and is greater than zero; and wherein one end of the concave neck portion is connected with the plurality of drill tail cutting edges, and the other end is connected with the plurality of drill bit cutting edges. Further, the concave neck portion respectively gradually expands toward the drill tail screw rod section and the positioning portion along the axial direction, respectively, and an end of the drill tail screw rod section adjacent to the threaded screw rod section tapers toward the drill bit screw rod section.

Further, the plurality of drill tail cutting edges each have a first helical surface, a second helical surface and a drill tail helix angle, and the drill tail helix angle is formed at joint of the first helical surface and the second helical surface.

Further, the plurality of drill tail cutting edges are asymmetric structures, and a first distance on the first helical surfaces each of the drill tail cutting edges from the drill tail helix angle to surface of the drill tail screw rod section is greater than zero, and the first distance is less than a second distance on the second helical surfaces from the drill tail helix angle to surface of the drill tail screw rod section.

Further, the major diameter of drill tail cutting edge is substantially equal to the major diameter of thread.

Further, a self-drilling screw structure manufactured by the manufacturing method of the self-drilling screw structure mainly, comprises a screw head portion; and a screw rod portion extending from the screw head portion, wherein a threaded screw rod section, a drill tail screw rod section and a drill bit screw rod section are sequentially formed at the screw rod portion from a side of the screw head portion along an axial direction, the threaded screw rod section has a rod diameter of thread and a thread protruding on the threaded screw rod section, the drill tail screw rod section has a rod diameter of drill tail, a plurality of drill tail cutting edges protrudes on the drill tail screw rod section, and a plurality of drill tail chip discharge grooves are located between the adjacent drill tail cutting edges, the plurality of drill tail cutting edges each have an major diameter of drill tail cutting edge, the drill bit screw rod section is sequentially provided with a concave neck portion, a positioning portion and a tip portion from the end adjacent to the drill tail screw rod section along the axial direction, a chisel point is formed by tapering from the end of the tip portion adjacent to the positioning portion to the other end along the axial direction, the concave neck portion is recessed from the end adjacent to the drill tail screw rod section to an end adjacent to the positioning portion along the axial direction to form an arc surface, the drill bit screw rod section forms a plurality of drill bit cutting edges and a plurality of drill bit chip discharge grooves by protruding from the chisel point toward the concave neck portion along the axial direction, and the plurality of drill bit chip discharge grooves are located between the adjacent drill bit cutting edges; wherein the rod diameter of drill tail is less than the rod diameter of thread and is greater than zero; and wherein one end of the concave neck portion is connected with the plurality of drill tail cutting edges, and the other end is connected with the plurality of drill bit cutting edges.

Further, the concave neck portion of the drill bit screw rod section respectively gradually expands toward the drill tail screw rod section and the positioning portion along the axial direction, and the drill bit chip discharge grooves extend to part of the concave neck portion from the chisel point through the tip portion and the positioning portion.

Further, the plurality of drill tail cutting edges each have a first helical surface, a second helical surface and a drill tail helix angle, and the drill tail helix angle is formed at joint of the first helical surface and the second helical surface.

Further, the screw body is obtained by firstly performing the step of forming drill tail screw rod section, the rod diameter of drill tail of the drill tail screw rod section is less than the rod diameter of thread of the drill tail screw rod section, and then performing the step of forming concave neck portion.

Further, the screw body is obtained by simultaneously performing the step of forming drill tail screw rod section and the step of forming concave neck portion.

Therefore, compared with the conventional technique, the invention has the following beneficial effects:

1. The manufacturing method of the self-drilling screw provided by the invention mainly comprises the steps of forming the concave neck portion, the positioning portion, the tip portion, the plurality of drill bit cutting edges and the plurality of drill bit chip discharge grooves at the drill bit screw rod section in stamping manner, then forming the plurality of drill tail cutting edges and the plurality of drill tail chip discharge grooves in thread rolling manner, the concave neck portion is connected with the plurality of drill bit cutting edges, and the other end of the concave neck portion is connected with the plurality of drill tail cutting edges, thereby forming cutting edges through different manufacture procedures and increasing the yield of manufacture.

2. The self-drilling screw structure manufactured by the manufacturing method of the self-drilling screw provided by the invention mainly comprises the concave neck portion between the plurality of drill bit cutting edges and the plurality of drill tail cutting edges. Therefore, when chips generated by the plurality of drill bit cutting edges are discharged through the drill bit chip discharge grooves and passes through the concave neck portion. The chips are randomly transferred to the plurality of drill tail chip discharge grooves of the drill tail screw rod section when passing through the concave neck portion, thereby preventing the chips from being accumulated due to the plurality of drill tail chip discharge grooves, reducing shaking of the self-drilling screw structure, and improving stability of the self-drilling screw structure during drilling.

DETAILED DESCRIPTION OF THE PREFERRED EMBODIMENTS

For the technology of the invention, referring to FIGS. 1, 2A, 2B, 2C, 3, 4, 5, 6, 7, 8, 9, and 10, which are embodiments of the invention, the invention provides a manufacturing method of a self-drilling screw, which is a method for manufacturing a self-drilling screw including threads with substantially equal major diameter formed at rod having various diameters. Referring to FIGS. 2A, 2B, 2C, and 3 first, the manufacturing method of the self-drilling screw comprises the following steps:

Providing screw body, providing a screw body 10 comprising a screw head portion 11 and a screw rod portion 12 extending from a side of the screw head portion 11 along an axial direction Z of the screw head portion 11.

Figure 3:
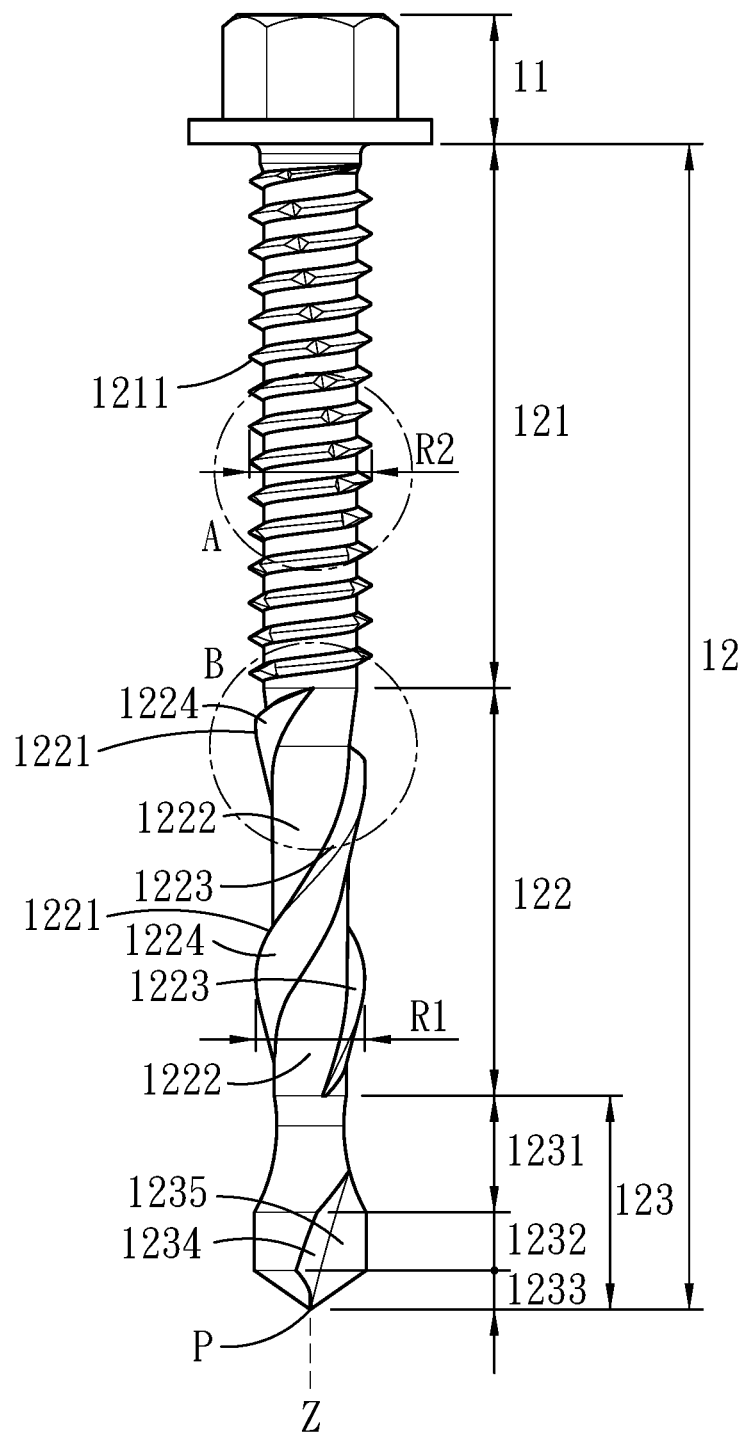
FIG. 3 is a side view of a self-drilling screw according to the invention.
Figure 4:
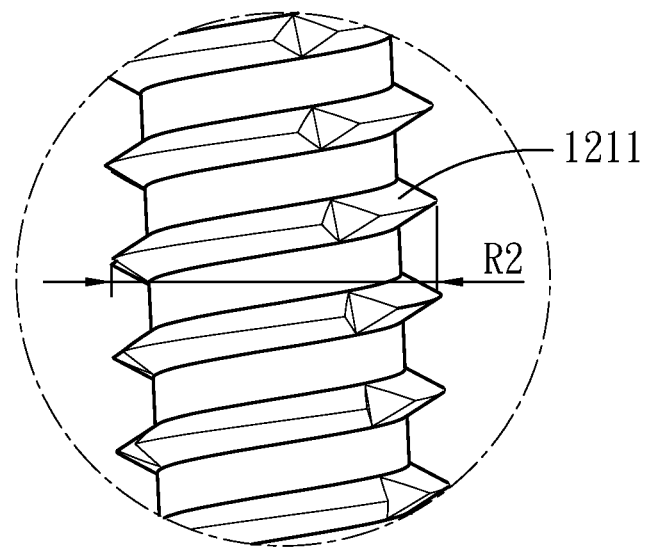
FIG. 4 is an enlarged partial view of circle A in FIG. 3.
Figure 5:
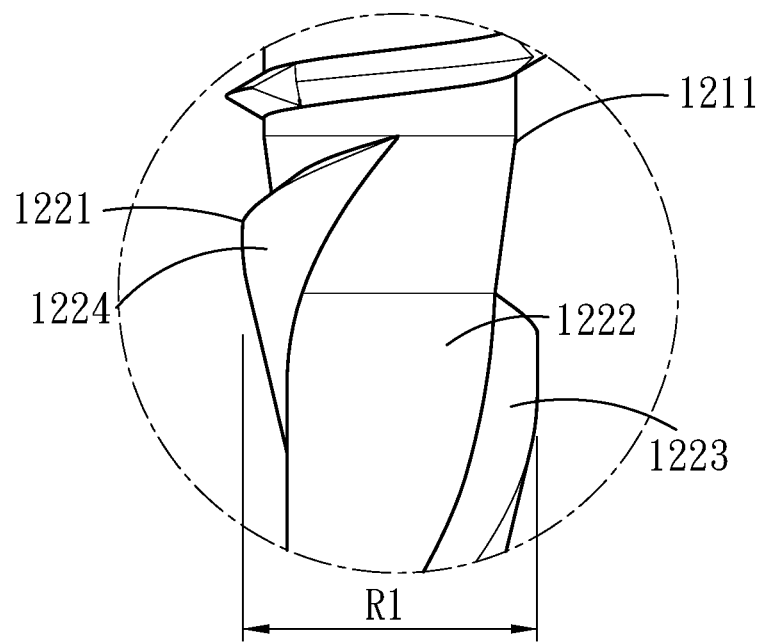
FIG. 5 is an enlarged partial view of circle B in FIG. 3.
Figure 6:
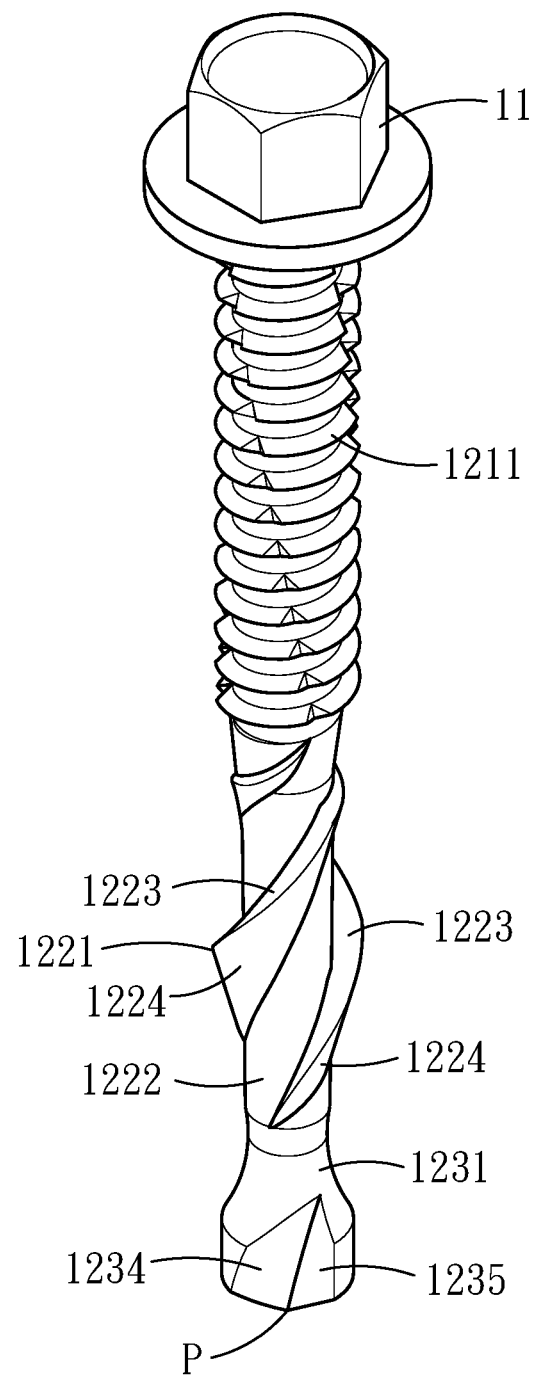
FIG. 6 is a perspective view of the self-drilling screw structure according to the invention.
Figure 7:
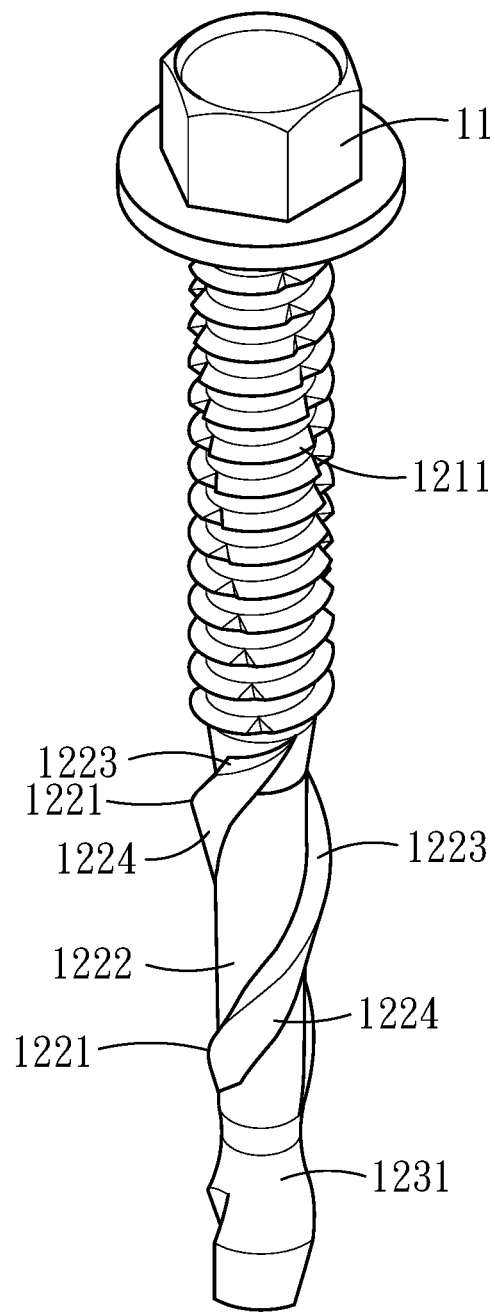
FIG. 7 is a perspective view of the self-drilling screw structure according to the invention.
Figures 8, 9:
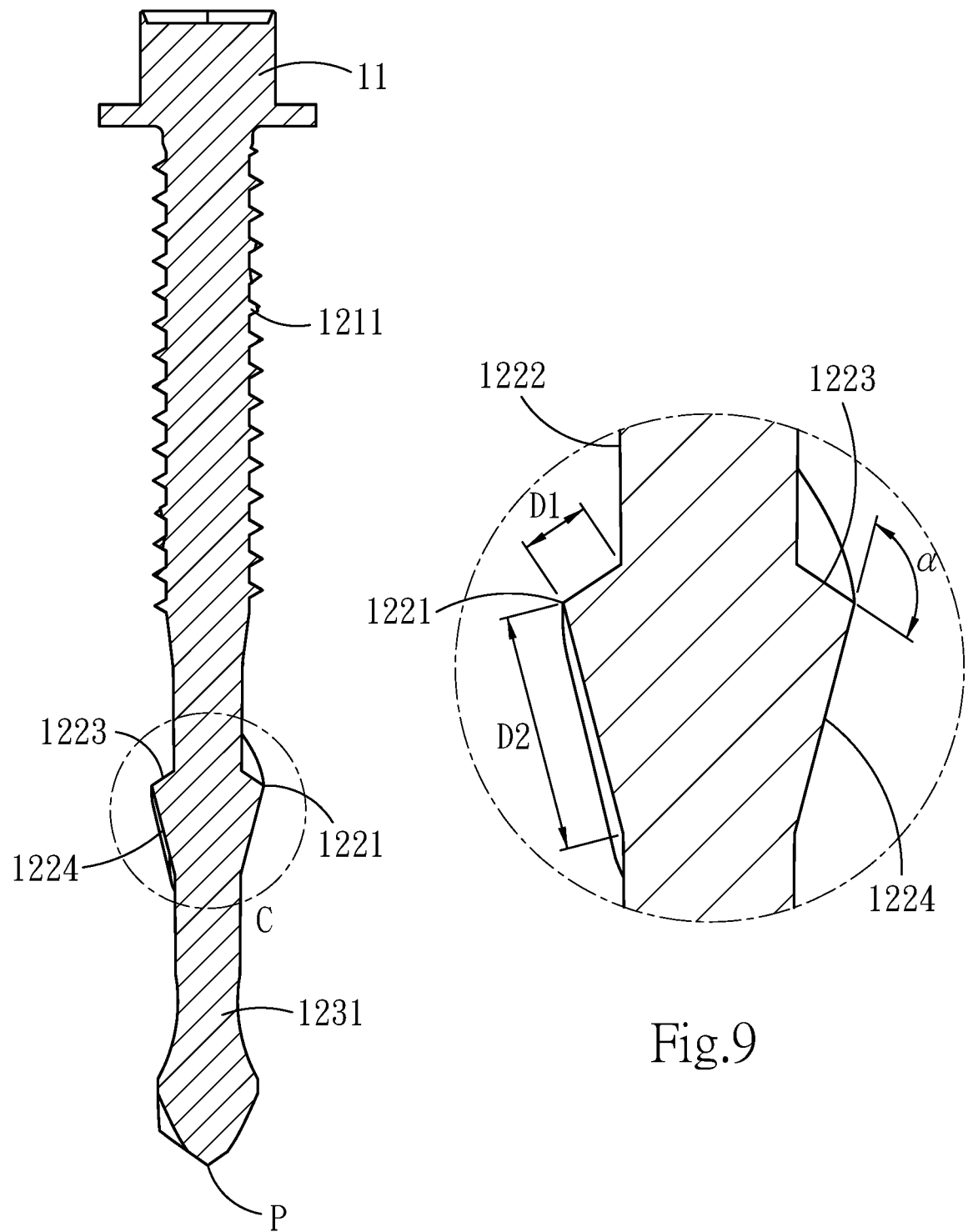
FIG. 8 is a cross-sectional side view of the self-drilling screw structure according to the invention.
FIG. 9 is an enlarged partial view of circle C in FIG. 8.

Forming drill tail screw rod section, sequentially forming a threaded screw rod section 121, a drill tail screw rod section 122 and a drill bit screw rod section 123 at the screw rod portion 12 from the side of the screw head portion 11, and wherein the threaded screw rod section 121 has a rod diameter D1, the drill tail screw rod section 122 has a rod diameter D2, and the drill tail screw rod section 122 and the drill bit screw rod section 123 in this embodiment are formed in a stamping manner Forming concave neck portion, and referring to FIG. 3, forming a concave neck portion 1231, a positioning portion 1232 and a tip portion 1233 from the drill bit screw rod section 123 in a stamping manner, the drill bit screw rod section 123 is sequentially provided with the concave neck portion 1231, the positioning portion 1232 and the tip portion 1233 from an end adjacent to the drill tail screw rod section 122 along the axial direction Z, and wherein a chisel point P is formed by tapering from an end of the tip portion 1233 adjacent to the positioning portion 1232 to the other end along the axial direction Z, the concave neck portion 1231 respectively gradually expands toward the drill tail screw rod section 122 and the positioning portion 1232 along the axial direction Z, the concave neck portion 1231 is recessed from an end adjacent to the drill tail screw rod section 122 to an end adjacent to the positioning portion 1232 along the axial direction Z to form an arc surface, an end of the drill tail screw rod section 122 adjacent to the threaded screw rod section 121 tapers toward the drill bit screw rod section 123, the drill bit screw rod section 123 forms a plurality of drill bit cutting edges 1234 and a plurality of drill bit chip discharge grooves 1235 from the chisel point P toward the concave neck portion 1231 along the axial direction Z, the plurality of drill bit chip discharge grooves 1235 are located between the adjacent drill bit cutting edges 1234, and in addition, the drill bit chip discharge grooves 1235 extend to part of the concave neck portion 1231 from the chisel point P through the tip portion 1233 and the positioning portion 1232.

Forming drill tail cutting edge, forming a plurality of drill tail cutting edges 1221 and a plurality of drill tail chip discharge grooves 1222 from one end of the drill tail screw rod section 122 connected with the concave neck portion 1231 in a thread rolling manner, and wherein the plurality of drill tail chip discharge grooves 1222 are located between the adjacent drill tail cutting edges 1221, the plurality of drill tail cutting edges 1221 each have a major diameter R1 of drill tail cutting edge, the plurality of drill tail cutting edges 1221 each have a first helical surface 1223, a second helical surface 1224 and a drill tail helix angle α, the drill tail helix angle α is formed at joint of the first helical surface 1223 and the second helical surface 1224, the plurality of drill tail cutting edges 1221 are asymmetric structures, and a first distance d1 on the first helical surfaces 1223 of each of the drill tail cutting edges 1221 from the drill tail helix angle α to surface of the drill tail screw rod section 122 is greater than zero, and the first distance d1 is less than a second distance d2 on the second helical surfaces 1224 from the drill tail helix angle α to surface of the drill tail screw rod section 122.

Forming thread, forming a thread 1211 in a thread rolling manner from the end of the threaded screw rod section 121 adjacent to the drill tail screw rod section 122, wherein the thread 1211 spirally extends to the screw head portion 11 along the axial direction Z, the thread 1211 has a major diameter R2 of thread, and the major diameter R1 of drill tail cutting edge is substantially equal to the major diameter R2 of thread.

Figure 1:
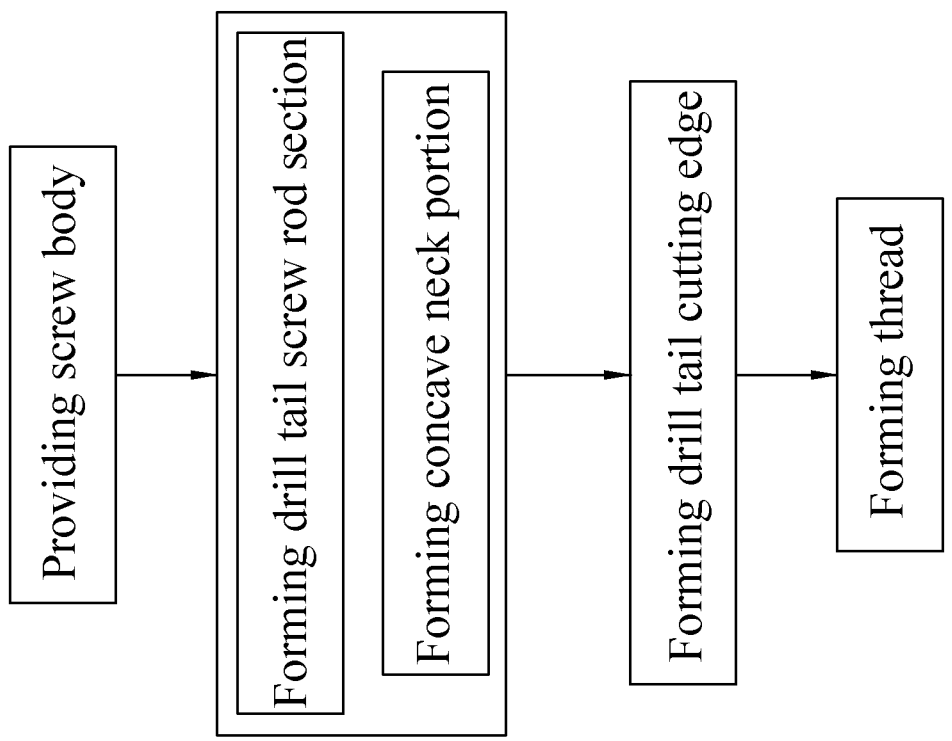
FIG. 1 is a flow chart of a manufacturing method of a self-drilling screw according to the invention.
Figure 2C:
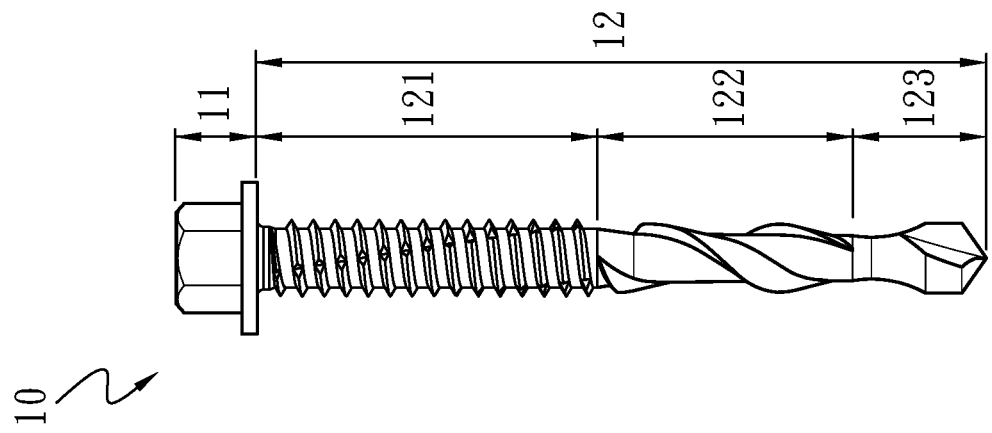
FIGS. 2A, 2B, and 2C are schematic diagrams of procedures of the manufacturing method of the self-drilling screw and corresponding molded structures according to the invention.
Figure 2B:
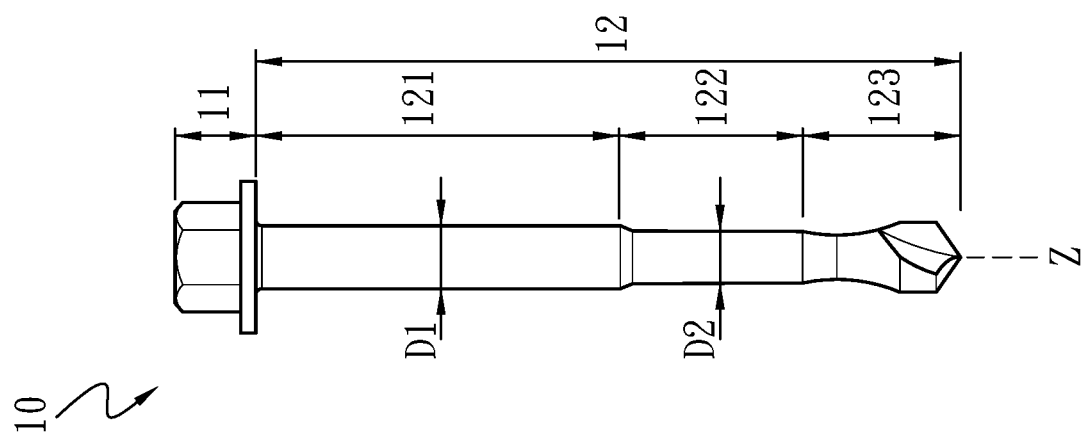
Figure 2A:
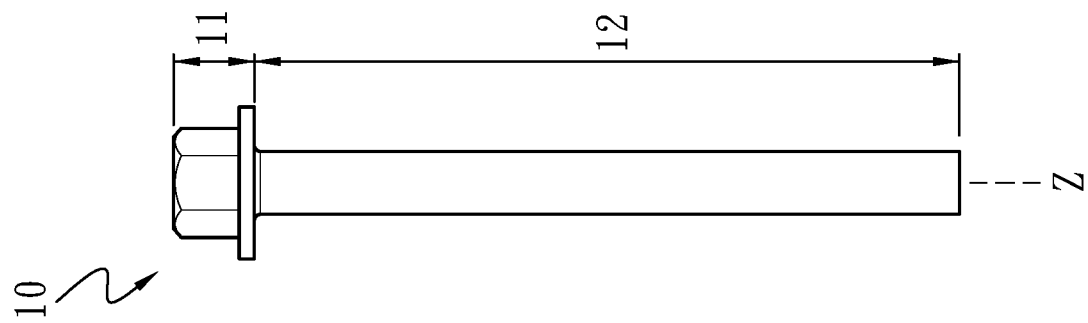
Figure 10:
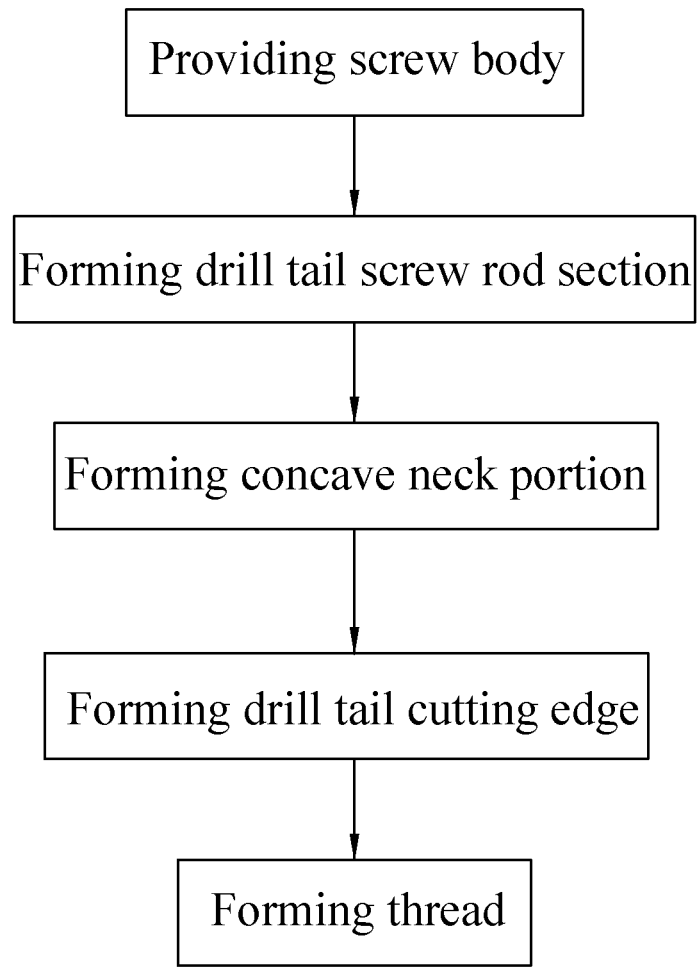
FIG. 10 is a flow chart of another manufacturing method of the self-drilling screw according to the invention.

Referring to FIG. 1, the screw body 10 is obtained by simultaneously performing the step of forming drill tail screw rod section and the step of forming concave neck portion; or referring to FIG. 10, the screw body is obtained by firstly performing the step of forming drill tail screw rod section so that the rod diameter D2 of the drill tail screw rod section 122 is less than the rod diameter D1 of the drill tail screw rod section 122, and then performing the step of forming concave neck portion. In the embodiment obtaining the screw body 10 by simultaneously performing the step of forming drill tail screw rod section and the step of forming concave neck portion, the drill tail screw rod section 122 is formed while the screw body 10 forms the concave neck portion 1231, the positioning portion 1232 and the tip portion 1233 at the drill bit screw rod section 123 in a stamping manner.

Furthermore, a self-drilling screw structure manufactured by the manufacturing method of the self-drilling screw mainly comprises the screw head portion 11 and the screw rod portion 12 extending from the screw head portion 11, wherein the threaded screw rod section 121, the drill tail screw rod section 122 and the drill bit screw rod section 123 are sequentially formed at the screw rod portion 12 from the side of the screw head portion 11 along the axial direction Z. The threaded screw rod section 121 has the rod diameter D1 and the thread 1211 protruding on the threaded screw rod section 121. The drill tail screw rod section 122 has the rod diameter D2, the plurality of drill tail cutting edges 1221 protrudes on the drill tail screw rod section 122, and the plurality of drill tail chip discharge grooves 1222 are located between the adjacent drill tail cutting edges 1221. The plurality of drill tail cutting edges 1221 each have the major diameter R1 of drill tail cutting edge. The drill bit screw rod section 123 is sequentially provided with the concave neck portion 1231, the positioning portion 1232 and the tip portion 1233 from the end adjacent to the drill tail screw rod section 122 along the axial direction Z. The chisel point P is formed by tapering from the end of the tip portion 1233 adjacent to the positioning portion 1232 to the other end along the axial direction Z. The concave neck portion 1231 is recessed from the end adjacent to the drill tail screw rod section 122 to an end adjacent to the positioning portion 1232 along the axial direction Z to form the arc surface. The drill bit screw rod section 123 forms the plurality of drill bit cutting edges 1234 and the plurality of drill bit chip discharge grooves 1235 by protruding from the chisel point P toward the concave neck portion 1231 along the axial direction Z. The plurality of drill bit chip discharge grooves 1235 are located between the adjacent drill bit cutting edges 1234.

The rod diameter D2 is less than the rod diameter D1 and is greater than zero. One end of the concave neck portion 1231 is connected with the plurality of drill tail cutting edges 1221, and the other end is connected with the plurality of drill bit cutting edges 1234. In this embodiment, in the step of forming drill tail screw rod section, the rod diameter D2 of the drill tail screw rod section 122 less than the rod diameter D1 of the threaded screw rod section 121 is before the step of forming concave neck portion, but is not limited to this. In another embodiment, the rod diameter D2 of the drill tail screw rod section 122 less than the rod diameter D1 of the threaded screw rod section 121 is provided in the step of forming concave neck portion of the self-drilling screw structure. In addition, length of the drill tail screw rod section 122 affects thickness of a workpiece able to be drilled by the self-drilling screw, so the drill tail screw rod section 122 is greater than or equal to the thickness of the workpiece. The drill bit screw rod section 123 is provided to position the self-drilling screw into the workpiece to be drilled, so a ratio of total length of the positioning portion 1232 and the tip portion 1233 to length of the concave neck portion 1231 is less than or equal to 0.86 and greater than or equal to "0.62". In this embodiment, with the major diameter R1 of drill tail cutting edge of an M8 standard screw, ratio of total length of the positioning portion 1232 and the tip portion 1233 to length of the concave neck portion 1231 is 0.75; with the major diameter R1 of drill tail cutting edge of an ¼ inch standard screw, ratio of total length of the positioning portion 1232 and the tip portion 1233 to length of the concave neck portion 1231 is 0.625; and with the major diameter R1 of drill tail cutting edge of a 7/32 inch standard screw, ratio of total length of the positioning portion 1232 and the tip portion 1233 to length of the concave neck portion 1231 is 0.714; but the ratio is not limited to this.

In addition, referring to FIGS. 2A, 2B, 2C, 3, 4, and 5, to provide the screw body 10 with the major diameter R1 of the plurality of drill tail cutting edges 1221 approximately equals to the major diameter R2 of the thread 1211, the rod diameter D2 of the drill tail screw rod section 122 is less than the rod diameter D1 of the threaded screw rod section 121; thus, in the step of forming drill tail cutting edge, the major diameter R1 of the plurality of drill tail cutting edges 1221 on the drill tail screw rod section 122 is approximately equal to the major diameter R2 of the thread 1211, so that the self-drilling screw structure is easy to drill into workpiece and chips. Moreover, the plurality of drill bit cutting edges 1234 and the plurality of drill tail cutting edges 1221 are respectively formed on the drill bit screw rod section 123 and the drill tail screw rod section 122, and the concave neck portions 1231 are arranged between the plurality of drill bit cutting edges 1234 and the plurality of drill tail cutting edges 1221, so that when a workpiece is drilled, the plurality of drill bit cutting edges 1234 produces the chips, and the chips are discharged from the plurality of drill bit chip discharge groove 1235 pass through the concave neck portion 1231 and are next discharged from at least one of the drill tail chip discharge grooves 1222 of the drill tail screw rod section 122, the structure reduces the pressure of the chips in the plurality of drill bit chip discharge grooves 1235 and the plurality of drill tail chip discharge grooves 1222, and also provided the plurality of drill tail cutting edges 1221 to cut the chips from the plurality of drill bit chip discharge grooves 1235 for the second time, so that the chips is discharged more smoothly. In addition, the first distance d1 of the first helical surface 1223 of each of the plurality of drill tail cutting edges 1221 is different in length from the second distance d2 of the second helical surface 1224, so the plurality of drill tail chip discharge grooves 1222 and the plurality of drill tail cutting edges 1221 each are designed to be asymmetric to prolong the product life span.

In conclusion, the manufacturing method of the self-drilling screw provided by the invention mainly comprises the steps of forming the drill bit screw rod section 123 provided with the concave neck portion 1231, the positioning portion 1232, the tip portion 1233, the plurality of drill bit cutting edges 1234 and the plurality of drill bit chip discharge grooves 1235 in the stamping manner, then forming the plurality of drill tail cutting edges 1221 and the plurality of drill tail chip discharge grooves 1222 in the thread rolling manner, and respectively connecting two ends of the concave neck portion 1231 with the plurality of drill bit cutting edges 1234 and the plurality of drill tail cutting edges 1221, thereby structures of the plurality of drill bit cutting edges 1234 and the drill tail cutting edge 1221 are formed in different manners to increase yield rate. The self-drilling screw structure manufactured by the manufacturing method of the self-drilling screw mainly comprises the concave neck portion 1231 between the plurality of drill bit cutting edges 1234 and the plurality of drill tail cutting edges 1221; therefore, chips generated by the plurality of drill bit cutting edges 1234 are discharged through the drill bit chip discharge grooves 1235 and passes through the concave neck portion 1231. The chips are randomly transferred to the plurality of drill tail chip discharge grooves 1222 of the drill tail screw rod section 122 when passing through the concave neck portion 1231, thereby preventing the chips from being accumulated due to the plurality of drill tail chip discharge grooves 1222, reducing shaking of the self-drilling screw structure, and improving stability of the self-drilling screw structure during drilling

What is claimed is:

1. A self-drilling screw structure, comprising:
a screw head portion; and
a screw rod portion extending from the screw head portion, wherein a threaded screw rod section, a drill tail screw rod section and a drill bit screw rod section are sequentially formed at the screw rod portion from a side of the screw head portion along an axial direction, the threaded screw rod section has a rod diameter of thread and a thread protruding on the threaded screw rod section, the drill tail screw rod section has a rod diameter of drill tail, a plurality of drill tail cutting edges protrudes on the drill tail screw rod section, and a plurality of drill tail chip discharge grooves are located between the adjacent drill tail cutting edges, the plurality of drill tail cutting edges each have a major diameter of drill tail cutting edge, the drill bit screw rod section is sequentially provided with a concave neck portion, a positioning portion and a tip portion from the end adjacent to the drill tail screw rod section along the axial direction, a chisel point is formed by tapering from the end of the tip portion adjacent to the positioning portion to the other end along the axial direction, the concave neck portion is recessed from the end adjacent to the drill tail screw rod section to an end adjacent to the positioning portion along the axial direction to form an arc surface, the drill bit screw rod section forms a plurality of drill bit cutting edges and a plurality of drill bit chip discharge grooves by protruding from the chisel point toward the concave neck portion along the axial direction, and the plurality of drill bit chip discharge grooves are located between the adjacent drill bit cutting edges;
wherein the rod diameter of drill tail is less than the rod diameter of thread and is greater than zero;
wherein the major diameter of drill tail cutting edge is substantially equal to a major diameter of thread; and
wherein one end of the concave neck portion is connected with the plurality of drill tail cutting edges, and the other end is connected with the plurality of drill bit cutting edges.

2. The self-drilling screw structure according to claim 1, wherein the concave neck portion of the drill bit screw rod section respectively gradually expands toward the drill tail screw rod section and the positioning portion along the axial direction, and the drill bit chip discharge grooves extend to part of the concave neck portion from the chisel point through the tip portion and the positioning portion.

3. The self-drilling screw structure according to claim 1, wherein the plurality of drill tail cutting edges each have a first helical surface, a second helical surface and a drill tail helix angle, and the drill tail helix angle is formed at joint of the first helical surface and the second helical surface.

4. The self-drilling screw structure according to claim 3, wherein the plurality of drill tail cutting edges are asymmetric structures, and a first distance on the first helical surfaces each of the drill tail cutting edges from the drill tail helix angle to surface of the drill tail screw rod section is greater than zero, and the first distance is less than a second distance on the second helical surfaces from the drill tail helix angle to surface of the drill tail screw rod section.

* * * * *